United States Patent
Chen et al.

(10) Patent No.: US 10,693,950 B2
(45) Date of Patent: *Jun. 23, 2020

(54) CONTROL METHOD FOR NETWORK COMMUNICATION SYSTEM INCLUDING BASE STATION NETWORK MANAGEMENT SERVER AND MULTI-ACCESS EDGE COMPUTING ECOSYSTEM DEVICE

(71) Applicant: INDUSTRIAL TECHNOLOGY RESEARCH INSTITUTE, Hsinchu (TW)

(72) Inventors: Yen-Chiu Chen, Hsinchu (TW); Chun-Chieh Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 277 days.

This patent is subject to a terminal disclaimer.

(21) Appl. No.: 15/843,326

(22) Filed: Dec. 15, 2017

(65) Prior Publication Data

US 2019/0075153 A1    Mar. 7, 2019

(30) Foreign Application Priority Data

Sep. 5, 2017 (TW) .............................. 106130299 A
Sep. 5, 2017 (TW) .............................. 106130300 A

(51) Int. Cl.
  *H04L 29/08* (2006.01)
  *H04L 12/24* (2006.01)
  (Continued)

(52) U.S. Cl.
  CPC .......... *H04L 67/10* (2013.01); *H04L 41/0896* (2013.01); *H04L 67/1097* (2013.01);
  (Continued)

(58) Field of Classification Search
  None
  See application file for complete search history.

(56) References Cited

U.S. PATENT DOCUMENTS 6,377,805 B1 *  4/2002  Anvekar ............... H04W 36/08
                                              455/11.1
6,898,634 B2 *  5/2005  Collins ................. G06F 3/0608
                                              709/215
(Continued)

FOREIGN PATENT DOCUMENTS

CN    106254408 A    12/2016
TW      I451797 B     9/2014
TW    201701710 A     1/2017

OTHER PUBLICATIONS

Habak et al., "FemtoClouds: Leveraging Mobile Devices to Provide Cloud Service at the Edge" Jun. 27, 2015.
(Continued)

*Primary Examiner* — Backhean Tiv
(74) *Attorney, Agent, or Firm* — Maschoff Brennan

(57) ABSTRACT

A control method for network communication system including base station network management server comprises of obtaining an item of neighbor base station identification information of a neighbor base station by a first base station; providing the first base station identification information to a base station network management server by the first base station; obtaining a first base station neighbor information from the base station network management server by a first MEC platform; producing an item of first platform neighbor information by the first MEC platform; determining whether a request signal matches the first platform neighbor information after receiving the request signal from a second MEC platform; providing the first platform identification information to the second MEC plat-
(Continued)

form while determining that the request signal matches the first platform neighbor information.

17 Claims, 12 Drawing Sheets

(51) Int. Cl.
*H04W 36/00* (2009.01)
*H04W 76/15* (2018.01)
*H04W 36/16* (2009.01)
*H04W 88/08* (2009.01)

(52) U.S. Cl.
CPC ... *H04W 36/00837* (2018.08); *H04W 36/165* (2013.01); *H04W 76/15* (2018.02); *H04L 41/5096* (2013.01); *H04W 88/08* (2013.01)

(56) References Cited

U.S. PATENT DOCUMENTS

| | | | |
|---|---|---|---|
| 8,982,732 B2* | 3/2015 | Balasubarmaniyan | H04W 48/20 370/255 |
| 10,037,778 B1* | 7/2018 | Farhan | G11B 20/1217 |
| 10,110,495 B1* | 10/2018 | Sabella | H04M 15/8083 |
| 10,159,086 B1* | 12/2018 | Costa | H04W 76/00 |
| 10,206,094 B1* | 2/2019 | Wen | H04W 8/082 |
| 10,390,275 B2* | 8/2019 | Liu | H04W 36/08 |
| 2002/0073019 A1* | 6/2002 | Deaton | G06Q 20/04 705/38 |
| 2003/0026254 A1 | 2/2003 | Sim | |
| 2005/0038971 A1* | 2/2005 | Tsukamoto | G06F 3/0608 711/170 |
| 2005/0068984 A1 | 3/2005 | Lee et al. | |
| 2005/0273668 A1 | 12/2005 | Manning | |
| 2005/0282547 A1* | 12/2005 | Kim | H04W 36/0055 455/436 |
| 2006/0045039 A1* | 3/2006 | Tsuneya | H04L 41/0816 370/318 |
| 2007/0010251 A1* | 1/2007 | Cho | H04W 36/0055 455/436 |
| 2010/0159936 A1 | 6/2010 | Brisebois et al. | |
| 2011/0103282 A1* | 5/2011 | Jeon | H04W 52/40 370/311 |
| 2011/0158190 A1* | 6/2011 | Kuwahara | H04B 7/0617 370/329 |
| 2012/0115541 A1* | 5/2012 | Suga | H04W 36/22 455/525 |
| 2012/0309292 A1* | 12/2012 | Sawai | H04W 24/02 455/7 |
| 2012/0331242 A1* | 12/2012 | Shaikh | G06F 12/0261 711/154 |
| 2016/0173604 A1 | 6/2016 | Panigrahi et al. | |
| 2017/0195931 A1* | 7/2017 | Mitsui | H04W 28/08 |
| 2018/0109590 A1* | 4/2018 | Rao | H04W 4/029 |
| 2018/0242204 A1* | 8/2018 | Zhu | H04W 36/0033 |
| 2018/0263039 A1* | 9/2018 | Fang | H04W 72/0486 |
| 2018/0270780 A1* | 9/2018 | Xiong | H04W 24/10 |
| 2018/0352051 A1* | 12/2018 | Tsai | H04L 67/32 |
| 2019/0014525 A1* | 1/2019 | Jin | H04W 8/22 |
| 2019/0028934 A1* | 1/2019 | Rasanen | H04W 36/0027 |
| 2019/0042318 A1* | 2/2019 | Ljung | H04W 8/26 |
| 2019/0045409 A1* | 2/2019 | Rasanen | H04W 36/36 |
| 2019/0075153 A1* | 3/2019 | Chen | H04L 67/10 |
| 2019/0075501 A1* | 3/2019 | Chen | H04L 41/0896 |
| 2019/0116534 A1* | 4/2019 | Kaptchouang | H04W 36/04 |
| 2019/0268812 A1* | 8/2019 | Li | H04W 36/0077 |

OTHER PUBLICATIONS

Fesehaye et al., "Impact of Cloudlets on Interactive Mobile Cloud Applications" IEEE 16th International Enterprise Distributed Object Computing Conference, 2012.

Satria et al., "Recovery for overloaded mobile edge computing". Future Generation Computer Systems, Jan. 30, 2016.

Jonas Michel and Christine Julien, "A Cloudlet-Based Proximal Discovery Service for Machine-to-Machine Applications" The Center for Advanced Research in Software Engineering Department of Electrical and Computer Engineering The University of Texas at Austin, 2013.

Fricker et al., "Analysis of an Offloading Scheme for Data Centers in the Framework of Fog Computing" AMC Trans. Model. Perform. Eval. Comput. Syst. Article 16, pp. 18, Sep. 2016.

Yujin Li and Wenye Wang, "Can Mobile Cloudlets Support Mobile Applications?" IEEE Conference on Computer Communications, 2014.

TW Office Action dated Jan. 16, 2018 in application No. 106130299.
TW Office Action dated Jan. 25, 2018 in application No. 106130300.

* cited by examiner

CONTROL METHOD FOR NETWORK COMMUNICATION SYSTEM INCLUDING BASE STATION NETWORK MANAGEMENT SERVER AND MULTI-ACCESS EDGE COMPUTING ECOSYSTEM DEVICE

CROSS-REFERENCE TO RELATED APPLICATIONS

This non-provisional application claims priority under 35 U.S.C. § 119(a) on Patent Application No(s). 106130300 filed in Taiwan, R.O.C. Sep. 5, 2017, and Application No(s). 106130299 filed in Taiwan, R.O.C. Sep. 5, 2017. The entire contents of each of the above-mentioned patent application is hereby incorporated by reference herein and made a part of this specification.

BACKGROUND

Technical Field

This disclosure relates to a control method for network communication system including base station network management server and multi-access edge computing device.

Related Art

Throughput of mobile network keeps increasing for the following reasons. One is that mobile devices get much more popular in the world. Another one is that internet services such as communication software or video streams grow continuously. Moreover, more and more enterprises expand their business scope to include smart device business, hoping to improve the convenience for the users to use the devices and gain their own commercial profit thereby. Under this trend, the throughput is going to overload the normal backhaul network. Further more, a remote cloud operation center is expected to be able to deal with the increasing amount of computation, which is a goal hard to be achieved. In other words, the traditional internet architecture is severely challenged by new technology.

In such a situation, the architecture, Multi-access Edge Computing (MEC), is proposed to solve problems induced by the increasing throughput. The MEC incorporates a new concept for internet architectures. As literally shown, MEC provides users with cloud operation service and information technology (IT) service at logical edge of the mobile network. MEC is came up with by the ETSI (European Telecommunications Standards Institute), mainly for reducing the burden of core internet equipment and enabling mobile network service providers to provide unique user experience for their customers.

However, there are still some challenges in MEC to be overcome. For example, challenges accompanied by issues like "content cache" or "hand over" have noticeable influences on the performance of MEC, which means that there is still improvement to be made for MEC.

SUMMARY

According to one or more embodiment of this disclosure, a control method for a network communication system including a BS network management server, which is adapted to a network communication system. The network communication system comprises a first MEC platform, a first BS and the BS network management server. The BS network management server communicates with the first MEC platform and the first BS. The method comprises: obtaining a neighbor BS ID of a neighbor BS by the first BS, wherein a first communication range of the first BS overlaps part of a second communication range of the neighbor BS; providing first BS neighbor information to the BS network management server by the first BS, wherein the first BS neighbor information includes the neighbor BS ID; obtaining the first BS neighbor information from the BS network management server by the first MEC platform; generating first platform neighbor information by the first MEC platform, wherein the first platform neighbor information includes a first platform ID of the first MEC platform and the neighbor BS ID; determining whether a request signal matches the first platform neighbor information by the network communication system when the request signal is received by the network communication system from a second MEC platform; and providing the first platform ID to the second MEC platform when the request signal is determined as matching the first platform neighbor information.

According to one or more disclosure of this disclosure, a MEC device configured to communicate with a BS network management server and a first BS. The MEC device comprises a processor and a memory. The processor is electrically connected to the memory storing a plurality of instructions and is adapted to execute the instructions for the MEC device to operate an MEC platform. The MEC platform is configured to perform steps comprising: obtaining a BS ID of a second BS from the BS network management server, wherein a second communication range of the second BS overlaps part of a first communication range of the first BS; generating platform neighbor information which includes a platform ID of the MEC platform and the BS ID of the second BS; and providing the platform neighbor information to a central management server for providing the platform neighbor information to an another MEC platform with whom the central management server communicates through the central management server, wherein the platform neighbor information includes the BS ID of the second BS.

According to one or more disclosure of this disclosure, a MEC device configured to communicate with a BS network management server and a first BS. The MEC device comprises a processor and a memory. The processor is electrically connected to the memory storing a plurality of instructions and is adapted to execute the instructions for the MEC device to operate an MEC platform. The MEC platform is configured to perform steps comprising: determining whether a request signal matches platform neighbor information by the MEC platform when the MEC platform receives the request signal broadcasted by another MEC platform; and providing a platform ID to the another MEC platform by the MEC platform when the MEC platform determines that the request signal matches the platform neighbor information.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
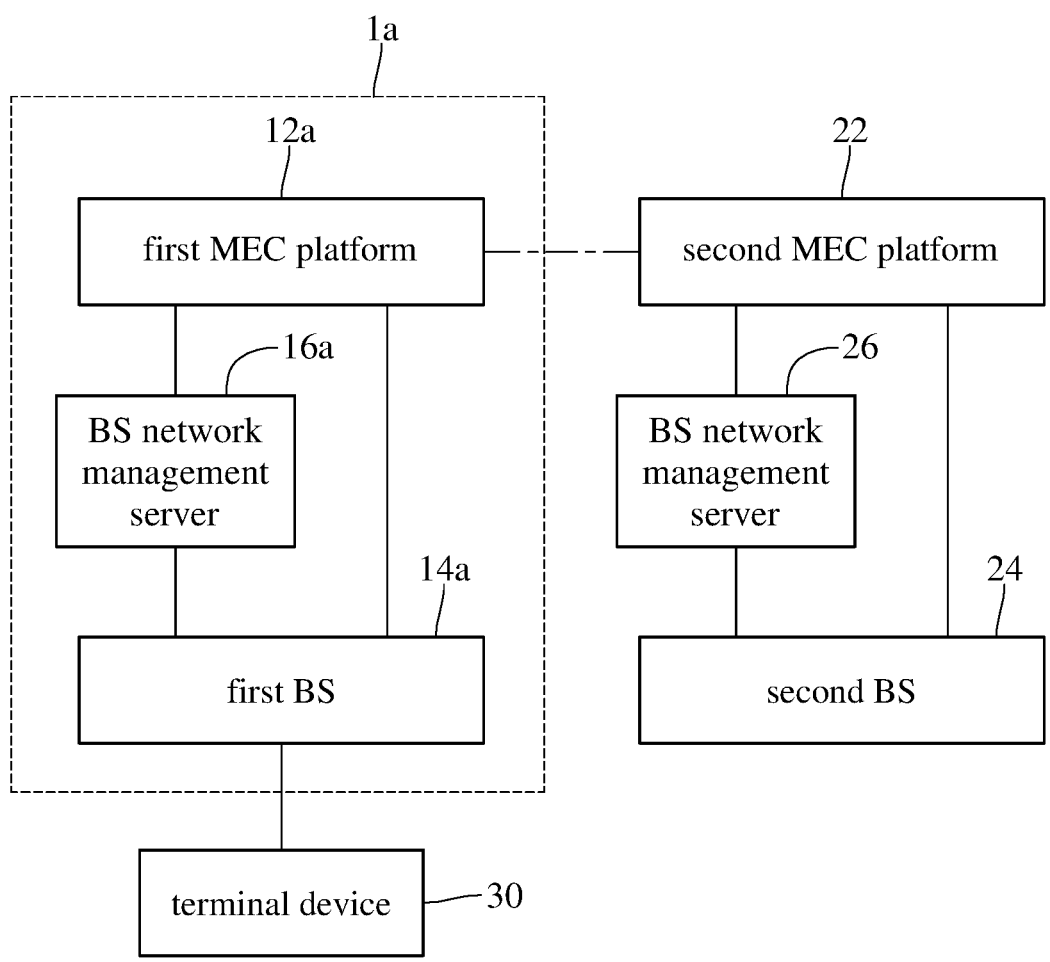
FIG. 1 is a function block diagram of a network communication system in a first embodiment of this disclosure.
Figure 2:
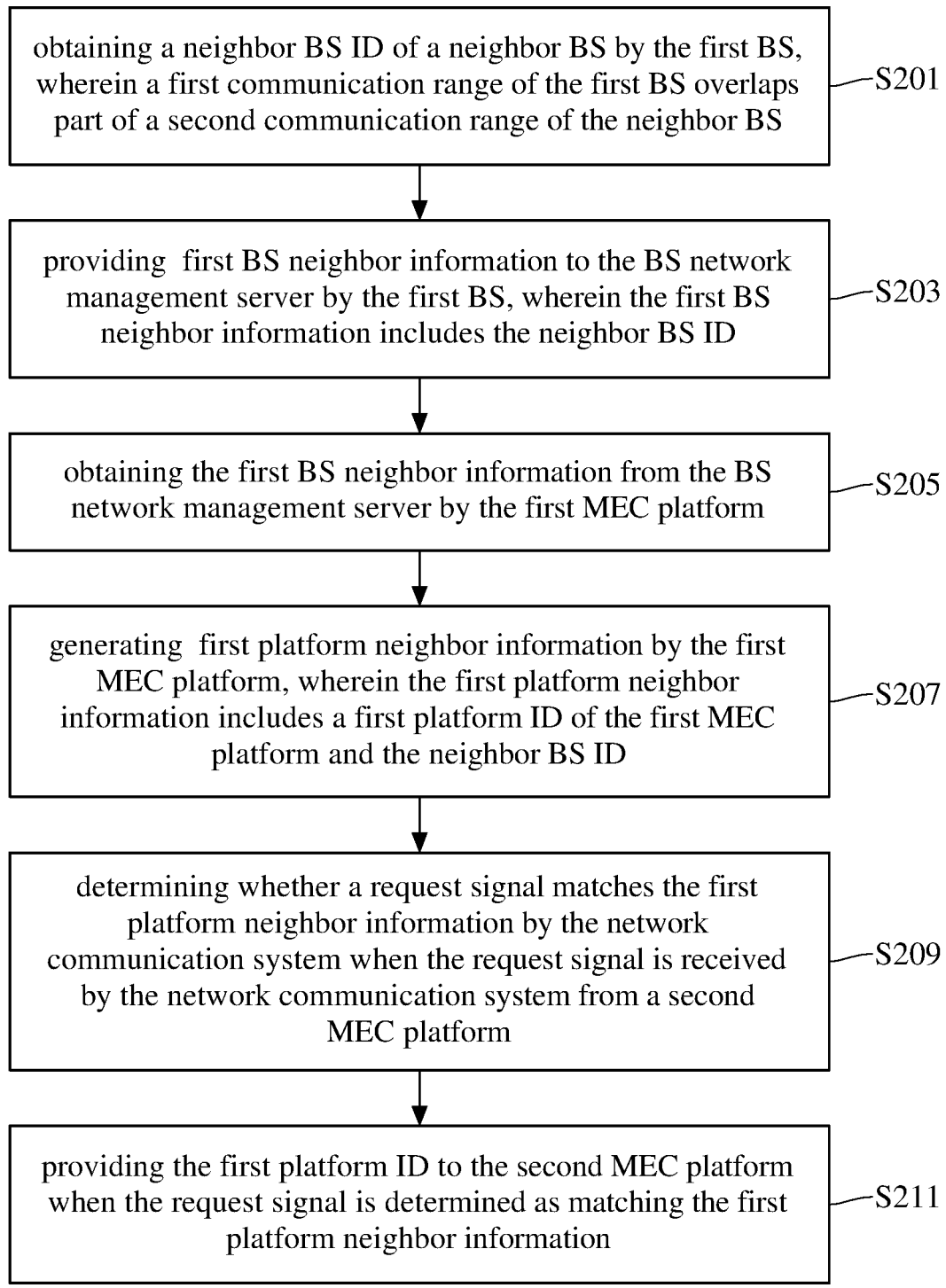
FIG. 2 is a flowchart of a control method for a network communication system including a BS network management server in the first embodiment of this disclosure.

This disclosure provides a control method for a network communication system including a BS (base station) network management server. Please refer to FIG. 1 and FIG. 2, which shows a control method for a network communication system including a BS network management server and an architecture the control method adapted to. FIG. 1 is a function block diagram of a network communication system in a first embodiment of this disclosure. FIG. 2 is a flowchart of a control method for a network communication system including a BS network management server of the first embodiment of this disclosure. The control method shown in FIG. 2 is adapted to network communication system 1a shown in FIG. 1. The network communication system 1a includes a first MEC platform 12a, a first BS 14a and a BS network management server 16a. The BS network management server 16a communicates with the first MEC platform 12a and the first BS 14a. The first MEC platform 12a is configured to communicate with first BS 14a. Herein, although the first MEC platform 12a communicates with one BS in this embodiment, the first MEC platform 12a can communicate with a plurality of BSs in practice. Said "communicate" means wired communication or wireless communication established between devices, and does not have the devices always maintain their connections to each other. For an example, the first BS 14a can support communication protocol and signal transmission for 4 G (4th generation). The BS network management server 16a is, for example, a NMS (network management system) or an EMS (element management system, EMS). The above description is merely an example and this disclosure is not thus limited thereto.

The first MEC platform 12a is, for example, a physical machine having operating ability, or the first MEC platform 12a is an application in a virtual machine operated by a server. In view of network architecture, the first MEC platform 12a can be deployed at the LTE macro base station (eNodeB) site, at the 3 G Radio Network Controller (RNC) site, at a multi-Radio Access Technology (RAT) cell aggregation site, and at an aggregation point which may also be at the edge of the core network. That is, the first MEC platform 12a is close to terminal devices of users. The terminal devices of users are located at a periphery of network architecture and are connected to the cloud server or the internet through the core network. Said "periphery of network" may be implemented by, but not limited thereto, an intersection of a LAN (local area network) and an internet, wherein the LAN is closer to the users than to the internet. The terminal devices of users are mobile electrical devices, such as smart phones, pads or laptops. In FIG. 1, a terminal device 30 as one of the terminal devices is shown for illustration. Specifically, the terminal device 30 may access the internet or communicate to another remote terminal device through the first BS 14.

The first MEC platform 12a is configured to serve the terminal device 30, so that the operational load of the terminal device 30 can be lowered when complicated operations are completed by the first MEC platform 12a. In another example, the first MEC platform 12a is configured to store and to handle information that the terminal device 30 may access. The above description is merely an example and does not thus limit the services provided by the first MEC platform 12a.

Please refer to FIG. 1 and FIG. 2 again. In step S201 of said control method, a neighbor BS ID of a neighbor BS is obtained by the first BS 14a, wherein a first communication range of the first BS 14a overlaps a part of a second communication range of the neighbor BS. In FIG. 1, as an example, a second BS 24 serves as the neighbor BS to the first BS 14a. Specifically, when it is talked about "a communication range overlapping another communication range," there's an intersection area between these two communication ranges, and when the terminal device 30 is located in said intersection area between the first communication range and the second communication range, both of the first BS 14a and the second BS 24 can communicate with the terminal device 30. In practice, the first BS 14a may obtain the neighbor BS ID (identification) of the neighbor BS by ANR (automatic neighbor relation) protocol defined by 3GPP for example. The ANR can be implemented with NRT (Neighbor Relation Table). The neighbor BS ID is an ID or an IP address (internet protocol address) of the neighbor BS (as the second BS 24 in this embodiment).

The neighbor BS relates to another MEC platform. In the embodiment, the second BS 24 and second MEC platform 22 are shown for an example. A BS network management server 26 is configured to communicate with the second MEC platform 22 and second BS 24, and the second MEC platform 22 is configured to communicate with the second BS 24. Details about the second MEC platform 22, the second BS 24 and the BS network management server 26 are similar to those of the first MEC platform 12a, the first BS 14a and the BS network management server 16a in the previous description and are not repeated herein. When a second BS 24 serves as the neighbor BS to the first BS 14a, the second MEC platform 22 is defined as a neighbor of the first MEC platform 12a.

In step S203, the first BS neighbor information is provided to the BS network management server 16a by the first BS 14a, wherein the first BS neighbor information includes the neighbor BS ID. In other words, the first BS neighbor information is configured to indicate that one or more BSs are the neighbors of the first BS 14a. In this embodiment, the first BS 14a neighbor information indicates that the second BS 24 neighbors neighboring the first BS 14a. In step S205, the first MEC platform 12a may obtain the first BS neighbor information from the BS network management server 16a. In step S207, the first MEC platform 12a generates first platform neighbor information, wherein the first platform neighbor information includes a first platform ID of the first MEC platform 12a and the neighbor BS IDs. In step S209, the network communication system 1a determines whether a request signal matches the first platform neighbor information, with the request signal sent by a second MEC platform 22 and received by the network communication system 1a. In step S211, the first platform ID is provided to the second MEC platform 22 when the request signal is determined as matching the first platform neighbor information. This disclosure also offers some implementations in practice illustrated as the following.

Figure 3:
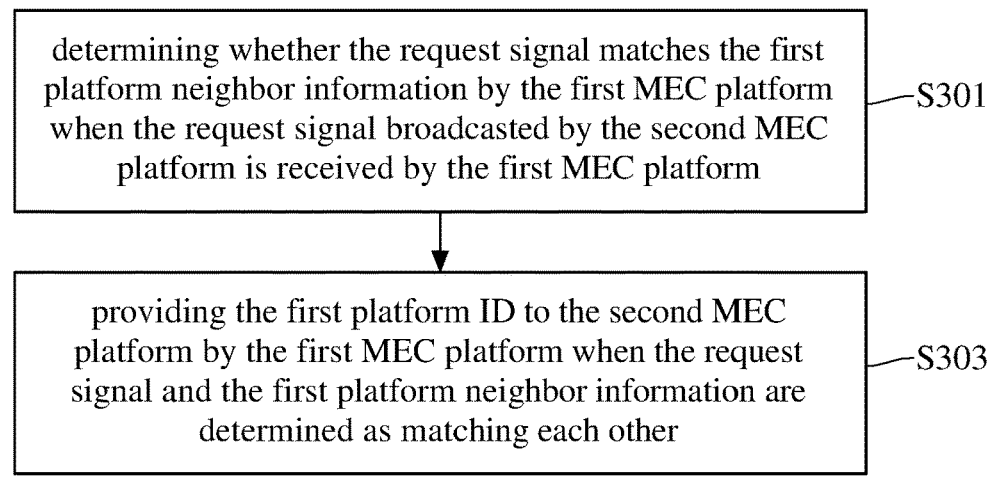
FIG. 3 is a flowchart for some steps of a control method for a network communication system including a BS network management server in a second embodiment of this disclosure.

Please refer to FIG. 3 for one of the said implementations. FIG. 3 is a flowchart for some steps of a control method adapted to a network communication system including a BS network management server in a second embodiment of the control method in this disclosure. As shown in FIG. 3, in step S301, the first MEC platform 12a determines whether the request signal matches the first platform neighbor information when the request signal broadcasted by the second MEC platform 22 is received by the first MEC platform 12a. In specific, the first MEC platform 12a is configured to determine whether the request signal has contents relative to the first platform neighbor information so as to further determine whether the request signal matches the first platform neighbor information. In an ideal situation, the request signal has the neighbor BS ID (BS ID of the second BS 24 in this embodiment) of the neighbor BS which neighbors or is next to the first BS 14a. In this embodiment, when the request signal is determined as having the neighbor BS ID of the neighbor BS which neighbors the first BS 14a, the first MEC platform 12a determines that the request signal matches the first platform neighbor information. On the other hand, the first MEC platform 12a may receive other request signals broadcasted by other MEC platform whose communication ranges does not overlap the first communication range of the first BS 14a. In this case, said other request signals do not have the neighbor BS IDs. Accordingly, the first MEC platform 12a determines that said other request signals from said other MEC platform do not match the first platform neighbor information.

In step S303, the first MEC platform 12a provides the first platform ID to the second MEC platform 22 when the request signal and the first platform neighbor information are determined as matching each other. When the second MEC platform 22 obtains the first platform ID, the second MEC platform 22 can establish neighbor relationship to first MEC platform 12a according to the first platform ID and communicate with the first MEC platform 12a to exchange information. On the contrary, when the first MEC platform 12a determines that the request signal does not match the first platform neighbor information, the first MEC platform 12a does not provide the first platform ID to the source of the request signal. In practice, the first MEC platform 12a and the second MEC platform 22 can define each other as a neighbor MEC platform by storing the platform ID of each other in their own corresponding information columns. In one embodiment, when the second MEC platform 22 receives the first platform ID provided by the first MEC platform 12a, the second MEC platform 22 further provides its own platform ID to the first MEC platform 12a. After the first MEC platform 12a receives the platform ID provided by the second MEC platform 22, the first MEC platform 12a establishes neighbor relationship to the second MEC platform 22. Ways to establish neighbor relationship can be designed by a person having ordinary skill in the art according to the present disclosure.

In view of the architecture, the first communication range of the first BS 14a overlaps at least part of the second communication range of the second BS 24. Therefore, there is a high possibility that the terminal device 30 moves to the second communication range from the first communication range. In other words, both of the first MEC platform 12a and the second MEC platform 22 are possible to serve for the terminal device 30 sequentially. As a result, with the control method, the first MEC platform 12a and the second MEC platform 22 can establish neighbor relationship to each other and share information. Thus, MEC can make determinations efficiently and better services can be provided to the terminal device 30.

Figure 4:
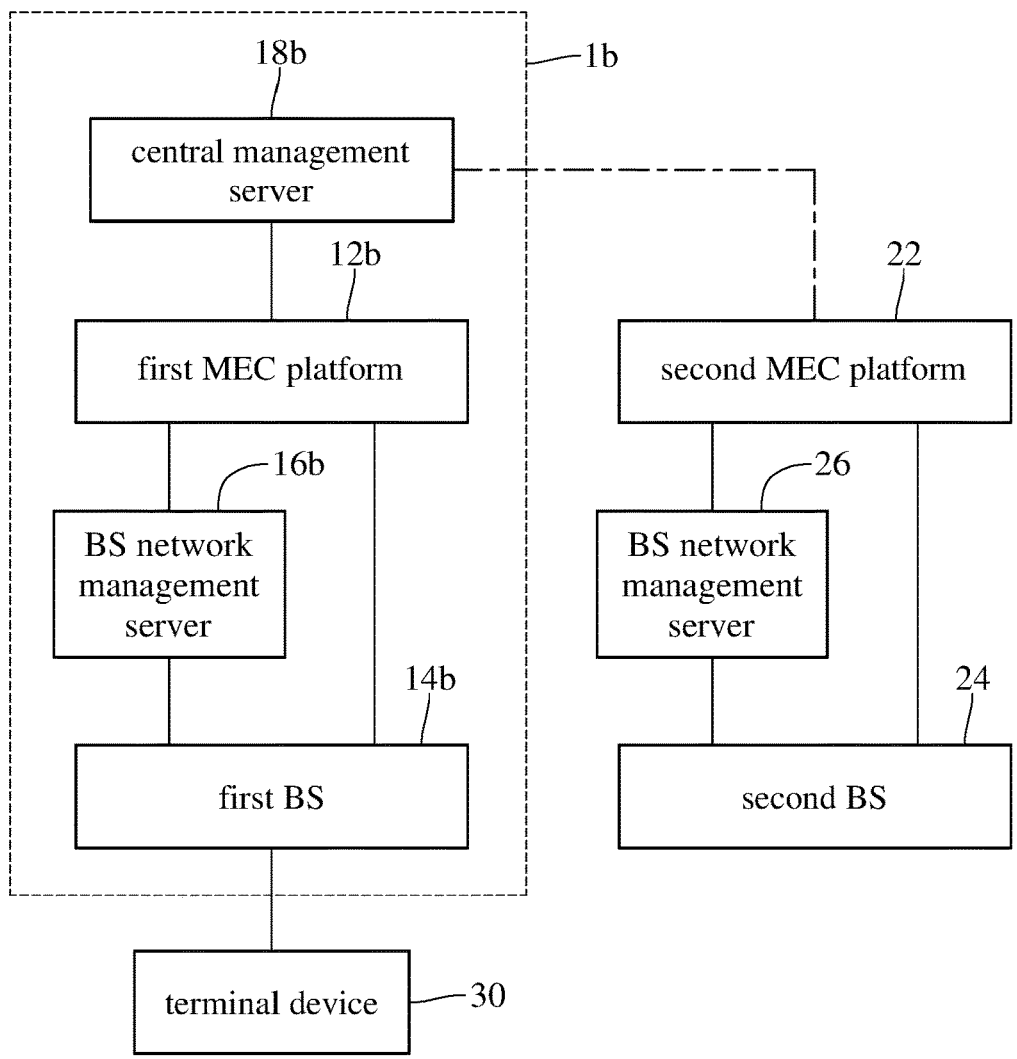
FIG. 4 is a function block diagram of a network communication system in a third embodiment of this disclosure.
Figure 5:
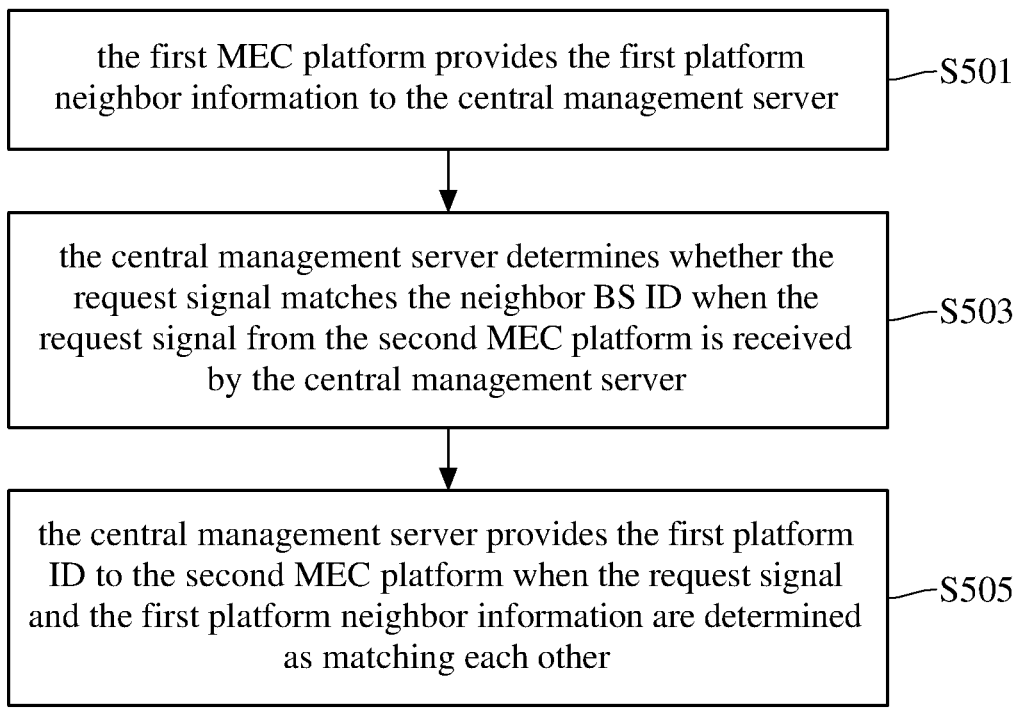
FIG. 5 is a flowchart for some steps of a control method for a network communication system including a BS network management server in the third embodiment of this disclosure.

Please continue to FIG. 4 and FIG. 5 illustrating another implementation. FIG. 4 is a function block diagram of a network communication system in a third embodiment of this disclosure. FIG. 5 is a flowchart for some steps of a control method for a network communication system including a BS network management server in the third embodiment of this disclosure. In the third embodiment, network communication system 1b further comprises a central management server 18b. The central management server 18b is configured to communicate with the first MEC platform 12b. As shown in FIG. 5, in step S501, the first MEC platform 12b provides the first platform neighbor information to the central management server 18b; in step S503, the central management server 18b determines whether the request signal matches the neighbor BS ID when the request signal from the second MEC platform 22 is received by the central management server 18b. As mentioned previously, the first platform neighbor information comprises the first platform ID of the first MEC platform 12b and the neighbor BS ID of the first MEC platform 12b. In step S505, the central management server 18b provides the first platform ID to the second MEC platform 22 when the request signal and the first platform neighbor information are determined as matching each other.

According to the above, the central management server 18b can be an intermediate role between MEC platforms. The second MEC platform 22 can build a communication connection to the central management server 18b and provide a request signal to the central management server 18b. Thus, the security issues and signal delivery issues of signal broadcasting can be avoided. On the other hand, the case with first platform neighbor information provided from the first MEC platform 12b to the central management server 18b is shown in the disclosure. However, in practice, the second MEC platform 22 can also provide corresponding platform neighbor information to the central management server 18b, for the first MEC platform 12b to access. In other words, the first MEC platform 12b can also request for its own neighbor MEC platform from the central management server 18b and establish neighbor relationship to its neighbor MEC platforms. Further more, the central management server 18b can obtain platform neighbor information not only from the first MEC platform 12b and the second MEC platform 22 but also from other MEC platforms. According to the above embodiments, said neighbor MEC platforms can establish neighbor relationship with each other, too. In the following, embodiment shown in FIG. 4 and FIG. 5 is recited for example.

As mentioned above, the first MEC platform 12b is configured to serve terminal device 30. In one embodiment, the first MEC platform 12b stores a plurality of first data pieces in its first storage space for the terminal device 30 to access. The contents and formats of the first data pieces are not limited herein. In practice, since the size of the first storage space is finite, when the first storage space is almost filled with the first data pieces, the first MEC platform 12b has to free up at least part of the first storage space by deleting some first data pieces or replacing some first data pieces by new data pieces so as to get non-occupied storage space for data pieces meeting the needs of users.

In one embodiment, the first MEC platform 12b stores a plurality of first data pieces in a first storage medium, with each first data piece corresponding to a first access record, and a plurality of second data pieces is stored in a second storage medium of the first MEC platform 12b, with each second data piece corresponding to a second access record. After the step of providing the first platform ID to the second MEC platform 22, the first MEC platform 12b can further optimize the arrangement of the first storage medium according to information relative to the second MEC platform 22.

Figure 6:
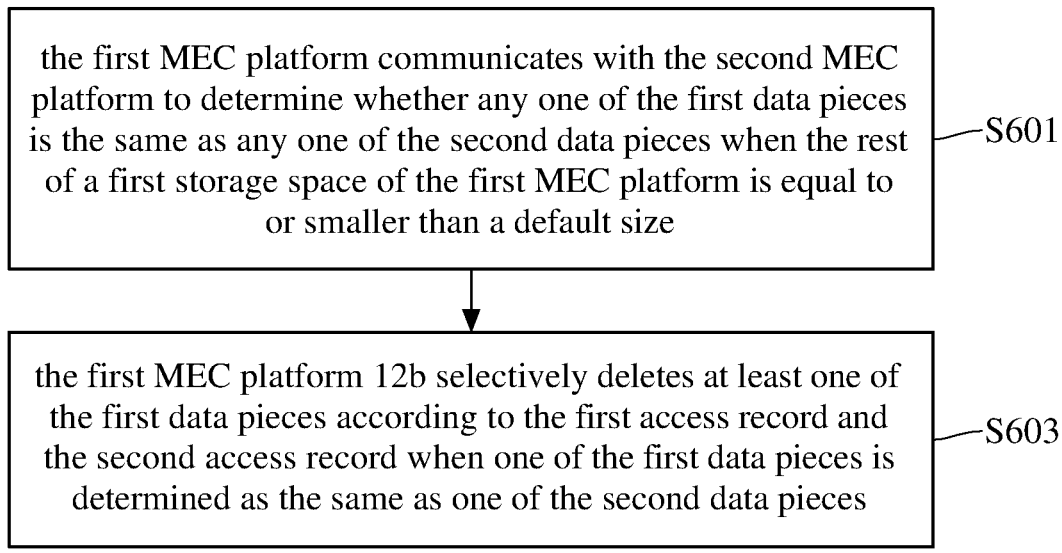
FIG. 6 is a flowchart for some steps of a control method for a network communication system including a BS network management server in a fourth embodiment of this disclosure.

Please refer to FIG. 6 exemplifying the data access mentioned above. FIG. 6 is a flowchart for some steps of a control method for a network communication system including a BS network management server in a fourth embodiment of this disclosure. In step S601, the first MEC platform 12b and the second MEC platform 22 are communicated to determine whether any one of the first data pieces is the same as any one of the second data pieces when the rest of a first storage space of the first MEC platform 12b is equal to or smaller than a default size. In step S603, the first MEC platform 12b selectively deletes at least one of the first data pieces according to the first access record and the second access record when one of the first data pieces is determined as the same as one of the second data pieces In accordance, this disclosure provides different kinds of implementations for step S603 as the following.

Figure 7:
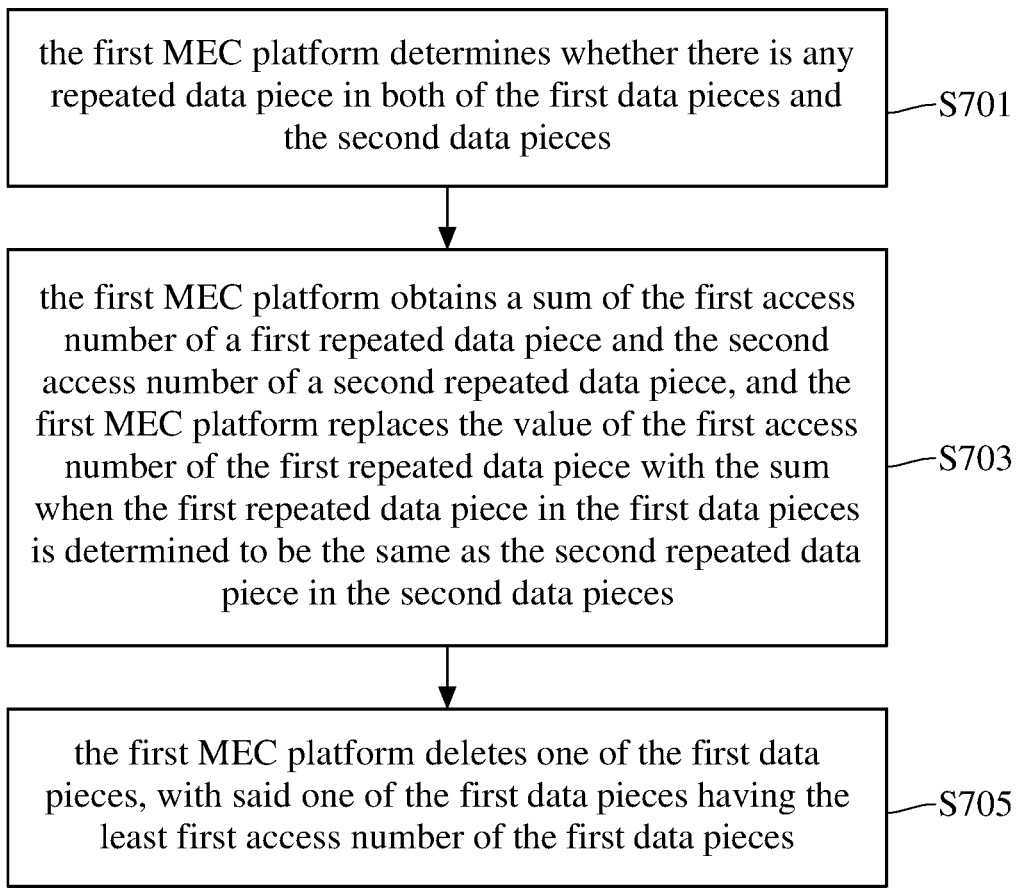
FIG. 7 is a flowchart for some steps of a control method for a network communication system including a BS network management server in a fifth embodiment of this disclosure.

Please refer to FIG. 7. FIG. 7 is a flowchart for some steps of a control method for a network communication system including a BS network management server in the fifth embodiment of this disclosure. In this embodiment, the first access record has a first access number of each of the first data pieces in a default time interval, and the second access record has a second access number of each of second data pieces in the default time interval. The step of selectively deleting part of the first data pieces according to the first access record and the second access record, the method further comprises the following steps. In step S701, the first MEC platform determines whether there is any repeated data piece in both of the first data pieces and the second data pieces. In step S703, the first MEC platform obtains a sum of the first access number of a first repeated data piece and the second access number of a second repeated data piece, and the first MEC platform replaces the value of the first access number of the first repeated data piece with the sum when the first repeated data piece in the first data pieces is determined as being the same as the second repeated data piece in the second data pieces. In step S705, the first MEC platform deletes one of the first data pieces, with said one of the first data pieces having the least first access number of the first data pieces. The first MEC platform herein is not limited thereto any of the above examples, and the first MEC platform 12b is taken as an example with the following illustration.

Please refer to the table 1 and table 2 shown as follows. The table 1 shows a plurality of first data pieces and corresponding first access numbers stored by the first MEC platform 12b. The table 2 shows a plurality of second data pieces and corresponding second access numbers stored by the second MEC platform 22. Specifically, the first MEC platform 12b stores data piece #1, data piece #16 and data piece #20 while the second MEC platform 22 stores data piece #1, data piece #4 and data piece #20. Namely, both of the first MEC platform 12b and the second MEC platform 22 store data piece #1 and data piece #20. In this scenario, data piece #1 and data piece #20 are the mentioned first repeated data piece (in respect to the first MEC platform 12b) or the second repeated data piece (in respect to the second MEC platform 22). As mentioned before, each of the first access number and the second access number is, for example, a number that for how many times each corresponding data pieces have been accessed in a default time interval. Said default time interval can be set as an hour, a time interval of length set by a user or a time interval back from a current time point.

TABLE 1

| first data piece | first access number |
| --- | --- |
| data piece#1 | 1000 |
| data piece#16 | 1248 |
| data piece#20 | 3634 |

TABLE 2

| second data piece | second access number |
| --- | --- |
| data piece#1 | 2450 |
| data piece#4 | 1029 |
| data piece#20 | 5350 |

In one traditional way, taking the first MEC platform 12b for example, the first MEC platform 12b usually takes only the first access numbers of the first data pieces into consideration for its operations. Therefore, when the first MEC platform 12b is short of storage space in the first storage medium, the first MEC platform 12b usually deletes the first data piece corresponding to the least first access number in the record of the first MEC platform 12b. In the case of the table 1 above, the first MEC platform 12b usually deletes data piece #1 or substitutes data piece #1 with a new data piece. However, as shown in table 2, the second access number corresponding to the data piece #1 is not the least one among the access numbers of the second data pieces and is even larger than some first access numbers of the first data pieces.

As mentioned before, with the first communication range of the first BS 14*b* overlapping the second communication range of the second BS 24, terminal devices communicated with the second BS 24 probably move away from the second BS 24 and are probably handed over to the first BS 14*b*. These terminal devices are initially served by the second MEC platform 22. However, after being handed over to the first BS 14*b*, these terminal devices are served by the first MEC platform 12*b* instead. Under some circumstances, these terminal devices whom are handed over to the first BS 14*b* from the second BS 24 may look forward to access some second data pieces, like data piece #1, from the first MEC platform. Nevertheless, in aforementioned traditional practices, the first MEC platform 12*b* may delete data piece #1 for lacking of storage space. Thus, when a terminal device requests for data piece #1 from the first MEC platform 12*b*, it costs the first MEC platform 12*b* for operational time and resources to re-obtain data piece #1 for the terminal device, causing service delay even errors.

For such a situation, after establishing neighbor relationship to the second MEC platform 22 as the mentioned embodiment, in the embodiment shown in FIG. 7, the first MEC platform 12*b* makes decisions about the storage changes further according to the second access record when the first MEC platform 12*b* determines to delete one or more first data pieces or to replace one or more first data pieces by one or more new data pieces. In one embodiment, the first MEC platform 12*b* updates one or more first access numbers according to the corresponding second access numbers. Referring to table 1 and table 2, both data piece #1 and data piece #2 are shown in both table 1 and table 2 and thus are defined as repeated data pieces. In accordance, the first MEC platform 12*b* obtains the sum of the first access number corresponding to data piece #1 and the second access number corresponding to data piece #1, and the first MEC platform 12*b* substitutes the original first access number corresponding to data piece #1 with the sum. Similarly, the first MEC platform 12*b* obtains another sum of the first access number corresponding to data piece #20 and the second access number corresponding to data piece #20, and the first MEC platform 12*b* substitutes the original first access number corresponding to data piece #20 with said another sum. According to the above, table 1 is thus updated to table 3 shown as follows. Refer to table 3, the one with the least first access number in the table 3 is data piece #16. Thus, the first MEC platform 12*b* deletes data piece #16 and does not delete data piece #1 like traditional ways. In practice, the first MEC platform 12*b* can continue accumulating the statistical result based on the updated data (like table 3), or the first MEC platform 12*b* can continue accumulating the statistical result based on the data before updated (like table 1).

TABLE 3

| first data piece | first access number |
| --- | --- |
| data piece#1 | 3450 |
| data piece #16 | 1248 |
| data piece #20 | 8984 |

In another embodiment, the first MEC platform 12*b* can make said decisions according to the larger one of the first access number and the second access number. Take table 3 for example, the first MEC platform 12*b* may delete data piece #16 instead of data piece #1 in such embodiment because the second access number of data piece #1 is larger than the other first access numbers of some first data pieces.

Figure 8:
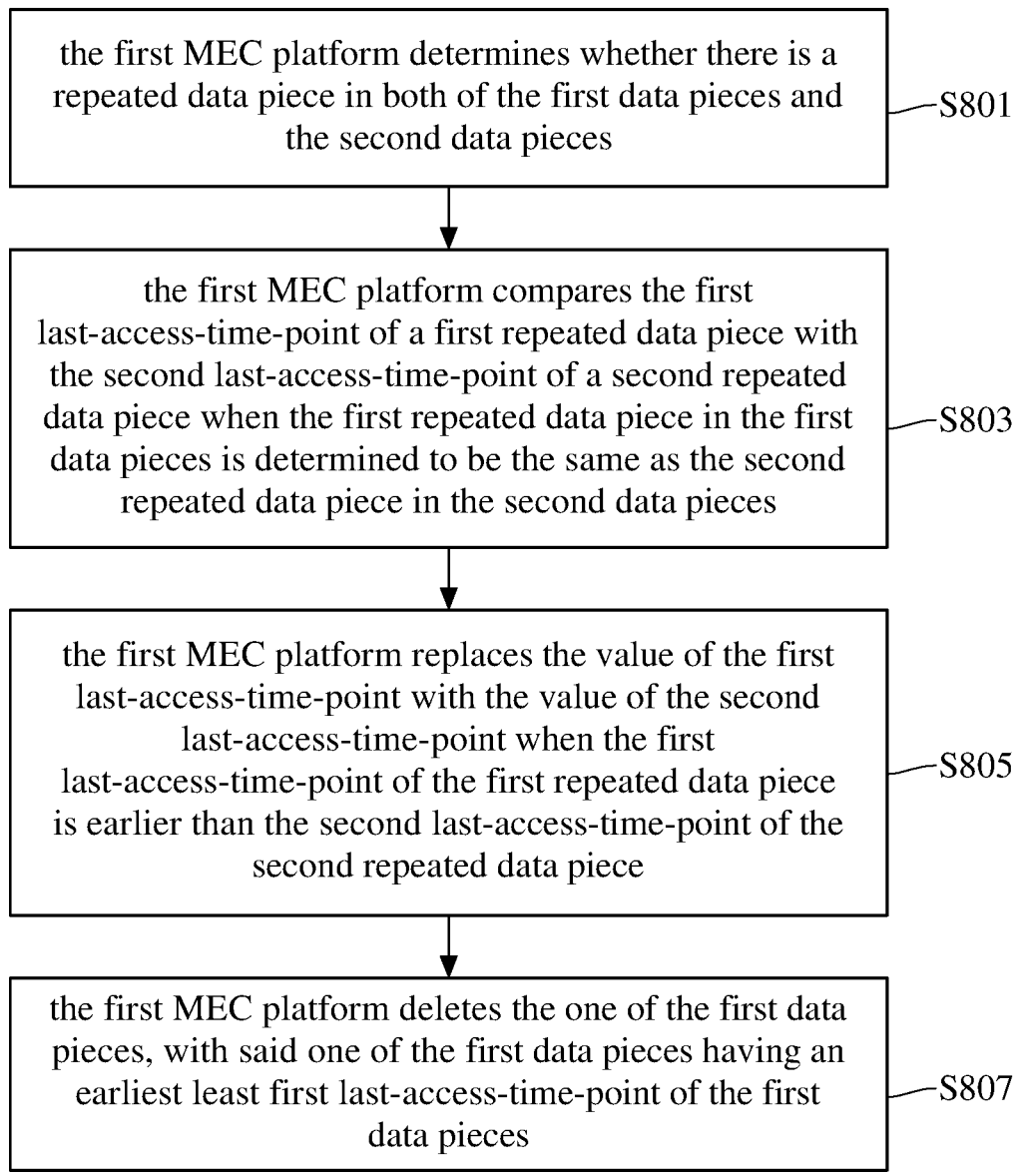
FIG. 8 is a flowchart for some steps of a control method for a network communication system including a BS network management server in a sixth embodiment of this disclosure.

Please refer to FIG. 8. FIG. 8 is a flowchart for some steps of a control method for a network communication system including a BS network management server in the sixth embodiment of this disclosure. In this embodiment, the first access record has the first last-access-time-point of each piece of first data pieces and the second access record has a second last-access-time-point of each piece of the second data pieces. The method further comprises the following steps. In step S801, the first MEC platform determines whether there is a repeated data piece in both of the first data pieces and the second data pieces. In step S803, the first MEC platform compares the first last-access-time-point of the first repeated data piece with the second last-access-time-point of the second repeated data piece when the first repeated data piece in the first data pieces is determined as being the same as the second repeated data piece in the second data pieces. In step S805, the first MEC platform replaces the value of the first last-access-time-point with the value of the second last-access-time-point when the first last-access-time-point of the first repeated data piece is earlier than the second last-access-time-point of the second repeated data piece. In step S807, the first MEC platform deletes one data piece whose last-access-time-point is the earliest in the first data pieces.

Please refer to table 4 and table 5 illustrating another example. A plurality of first data pieces and a plurality of first last-access-time-points corresponding to the first data pieces are recorded in table 4. A plurality of second data pieces and a plurality of second last-access-time-points corresponding to the second data pieces are recorded in the table 5. Specifically, the first MEC platform 12*b* stores data piece#1, data piece#16 and data piece#20, and the second MEC platform 22 stores data piece#1, data piece#4 and data piece#20. Wherein, both of the first MEC platform 12*b* and the second MEC platform 22 store data piece#1 and data piece#20.

TABLE 4

| first data piece | first last-access-time-point |
| --- | --- |
| data piece#1 | 20:53 |
| data piece #16 | 20:30 |
| data piece #20 | 20:20 |

TABLE 5

| second data piece | second last-access-time-point |
| --- | --- |
| data piece #1 | 20:48 |
| data piece #4 | 20:12 |
| data piece #20 | 20:33 |

In traditional ways and in respect to the first MEC platform 12*b*, the first MEC platform 12*b* takes the first last-access-time-points of the first data pieces into consideration. Therefore, when the first MEC platform 12*b* is short of storage space in the first storage medium, the first MEC platform 12*b* usually deletes the first data piece corresponding to the earliest first last-access-time-points, namely the one not being accessed for the longest time. With information in table 4 and table 5, in traditional ways, the first MEC platform 12b deletes data piece #20 or substitutes data piece #20 with new data piece. However, as shown in table 5, the second last-access-time-point of data piece #20 is not the earliest among all the second data pieces, and is even later than the first last-access-time-point of some first data pieces.

For such a situation, after establishing neighbor relationship to the second MEC platform 22 as the mentioned embodiment, in the embodiment shown in FIG. 8, when the first MEC platform 12b determines to delete one or more first data piece or to replace one or more first data piece by one or more new data piece, the first MEC platform 12b makes decision about the space storage changes further according to the second access record. In one embodiment, referring to table 4 and table 5, both data piece #1 and data piece #20 are shown in both table 1 and table 2 and thus are defined as repeated data pieces. In accordance, the first MEC platform 12b determines which of the first last-access-time-point of data piece #1 and the second last-access-time-point of data piece #1 is earlier, and the first MEC platform 12b determines which of the first last-access-time-point of data piece #20 and the second last-access-time-point of data piece #20 is earlier. In this embodiment, the first last-access-time-point (20:53) corresponding to data piece #1 is not earlier than the second last-access-time-point (20:48) corresponding to data piece #1, thus the first MEC platform 12b keeps the first last-access-time-point corresponding to data piece #1. On the other hand, the first last-access-time-point (20:20) corresponding to data piece #20 is earlier than the second last-access-time-point (20:33) corresponding to data piece #20, thus the first MEC platform 12b substitutes the value of the first last-access-time-point corresponding to data piece #20 with the second last-access-time-point corresponding to data piece #20 so as to update the first last-access-time-point corresponding to data piece #20. In accordance, the first MEC platform 12b updates table 4 into table 6 as the following. As shown in table 6, data piece #16 has the earliest first last-access-time-point, which means that data piece #16 is not accessed for the longest time. Accordingly, first MEC platform 12b delete data piece#16 to free up some storage space.

TABLE 6

| first data piece | first last access time point |
|---|---|
| data piece #1 | 20:53 |
| data piece #16 | 20:30 |
| data piece #20 | 20:33 |

Figure 9:
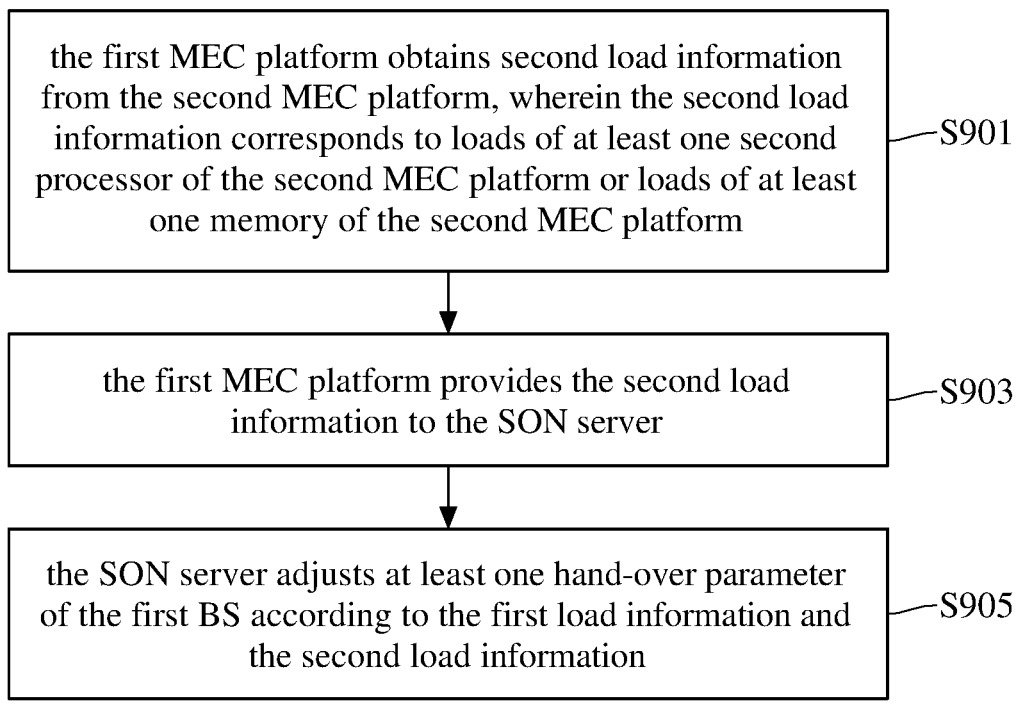
FIG. 9 is a flowchart for some steps of a control method for a network communication system including a BS network management server in a seventh embodiment of this disclosure.
Figure 10:
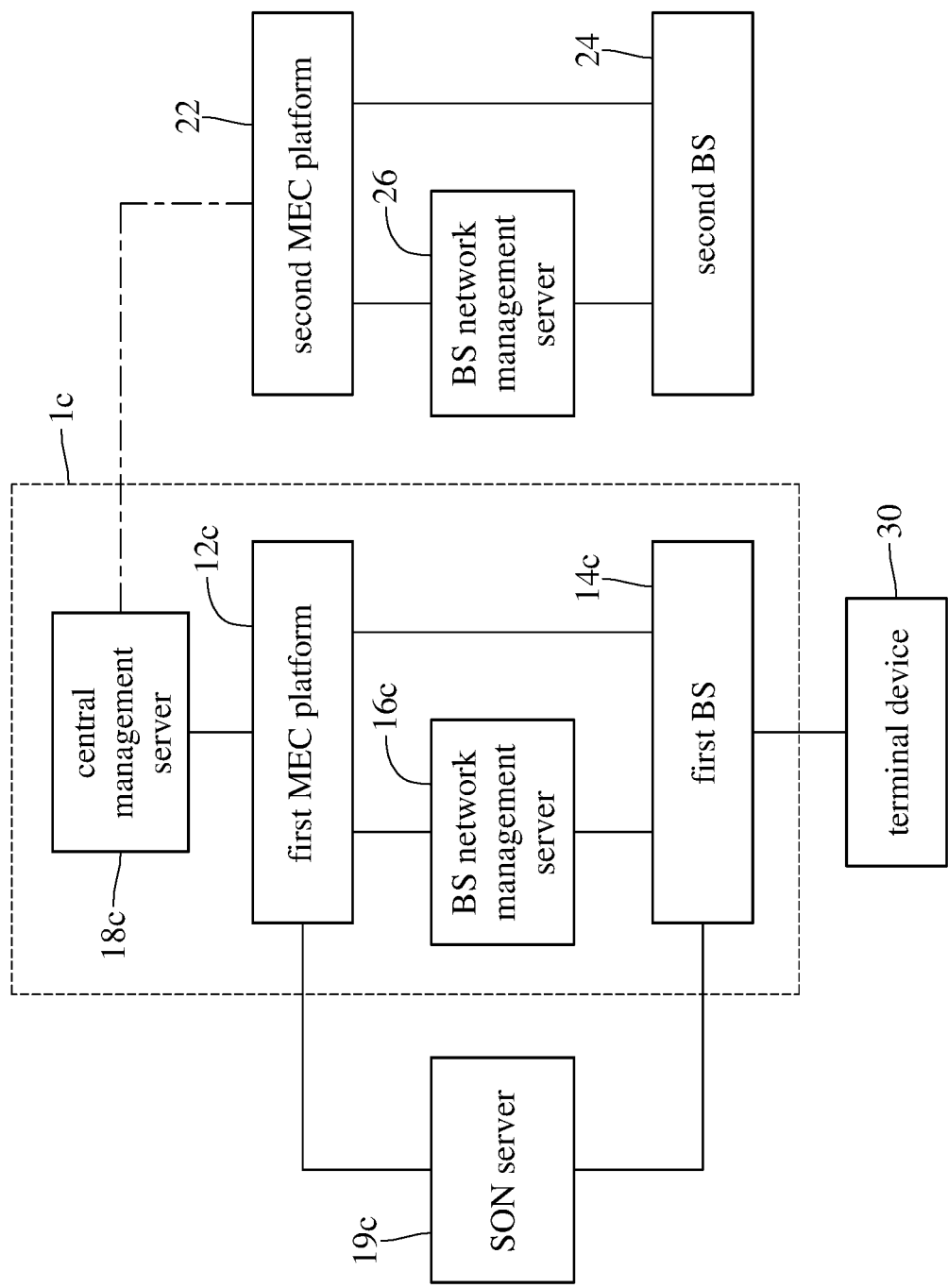
FIG. 10 is a function block diagram of a network communication system in the seventh embodiment of this disclosure.

With the daily advancing communication architecture, a network communication system may further comprises a self organizing network (SON) server. Details about the SON server are already recorded in the specification of 3GPP and in the specification of LTE and thus are not repeated herein. The SON server can be configured to adjust the handover parameters of a base station. For example, A3 offset of TTT (time to trigger), broadly used in the industry, can serve as one of said handover parameters but the handover parameters is not limited thereto. In the past, the SON server adjusted the handover parameters according to the signal strength of signals between an end devices and a BS only, thus the whole system can barely have preferable performance. This disclosure makes quite an improvement in this issue. Please refer to FIG. 9 and FIG. 10, wherein FIG. 9 is a flowchart for some steps of a control method for a network communication system including a BS network management server in a seventh embodiment of this disclosure, and FIG. 10 is a function block diagram of a network communication system in a seventh embodiment of this disclosure. As shown in FIG. 10, the network communication system, for example, further comprises a SON server 19c. The SON server 19c is configured to communicate with the first MEC platform 12c. After the aforementioned step for providing the first platform ID to the second MEC platform 22, the control method further comprises the following steps. In step S901, the first MEC platform 12c obtains second load information from the second MEC platform 22, wherein the second load information corresponds to loads of at least one second processor of the second MEC platform 22 or loads of at least one memory of the second MEC platform 22. In step S903, the first MEC platform 12c provides the second load information to the SON server 19c. In step S905, the SON server 19c adjusts at least one hand-over parameter of the first BS 14c according to a first load information of the first MEC platform 12c and the second load information.

Figure 11:
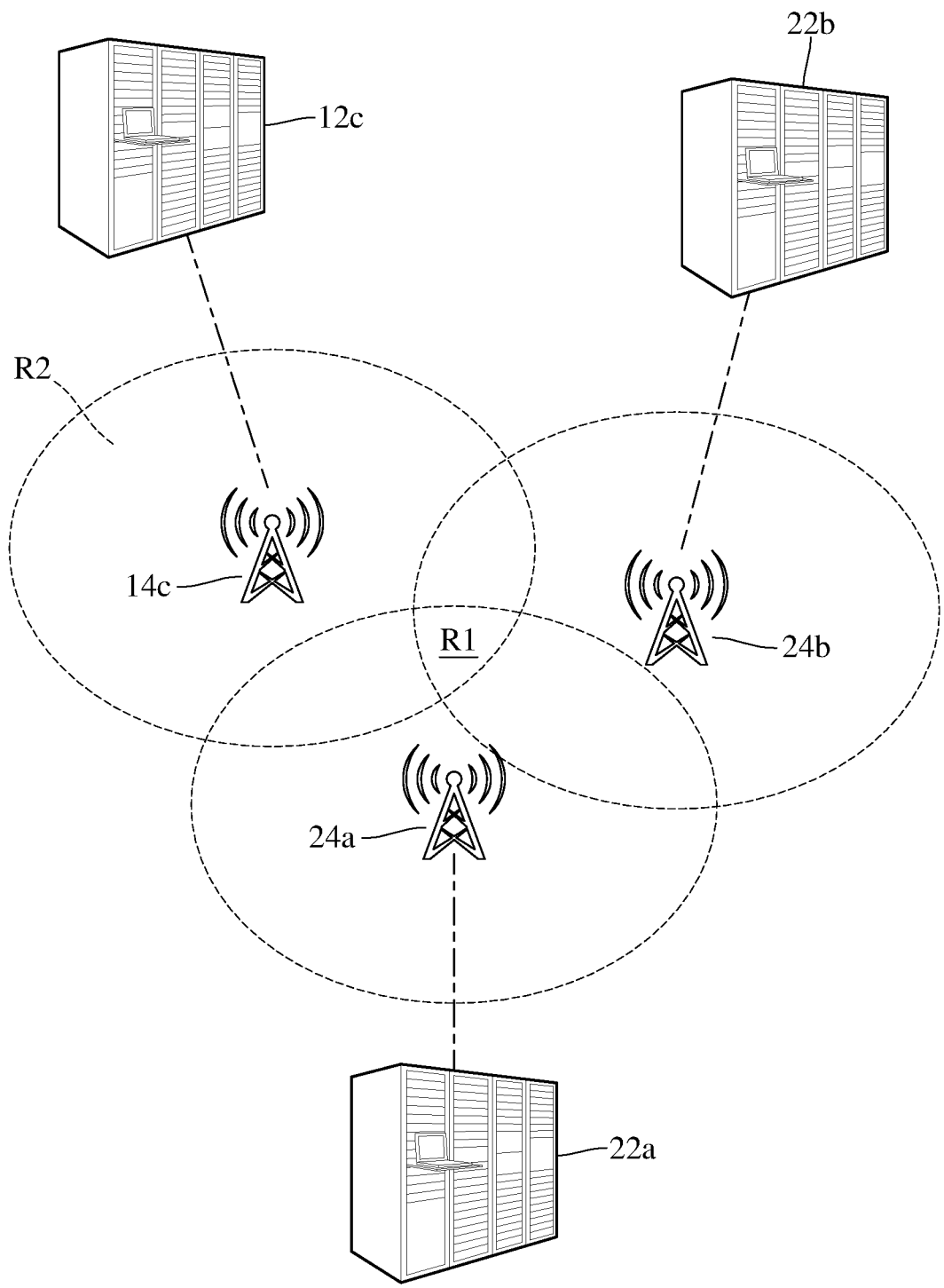
FIG. 11 is an illustration diagram for handing over a terminal device in an embodiment of this disclosure.

Please refer to FIG. 11. FIG. 11 is an illustration diagram for handing over a terminal device in an embodiment of this disclosure. There are a first MEC platform 12c, a second MEC platform 22a, a second MEC platform 22b, a first BS 14c and a second BS 24a and 24b shown in FIG. 11. The first MEC platform 12c communicates with the first BS 14c. The second MEC platform 22a communicates with the second BS 24a. The second MEC platform 22b communicates with the second BS 24b. Further more, there are a region R1 and a region R2 shown in FIG. 11. The region R1 is the place wherein the communication range of the first BS 14c overlaps the communication range of the second BS 24a together with the communication range of the second BS 24b. The region R2 is the place wherein the communication range of the first BS 14c overlaps the communication range of the other BSs. In this embodiment, both part of the communication range of the second BS 24a and part of the communication range of the second BS 24a overlap part of the communication range of the first BS 14a. Therefore, both of the second MEC platform 22a and the second MEC platform 22b are defined as neighbors of the first MEC platform 12c. The relative details about neighbor relationship are similar to what are disclosed in the aforementioned paragraphs and are not repeated again.

In the past, when a terminal device, taking the previous mentioned terminal device 30 for example, moves away from the region R2 to the region R1, the SON server 19c adjusts the hand-over parameters of the first BS 14c according to signal strength of the signal between the terminal device 30 and each BS. Which means, in traditional ways, the terminal device 30 may be handed over to the BS which can communicate with the terminal device 30 with the strongest signal among all said BSs. However, in practice, each BS may communicate with a plurality of terminal devices. In other words, the MEC platform 12c, the second MEC platform 22a and the second MEC platform 22b may serve other terminal devices at the same time. In an assumed scenario, the signal strength between the second BS 24a and the terminal device 30 may be the strongest, but the second MEC platform 22a serves more terminal devices than the other MECs. In such scenario, the second MEC platform 22a has a load heavier than other MECs. Therefore, if the terminal device 30 is handed over to the second BS 24a, the second MEC platform 22a may not serve the terminal device 30 well, even causing severe delay.

Compared to the traditional ways, in the embodiment of FIG. 9 and FIG. 10, the SON server 19c adjusts the parameters further according to the load information of the BSs. Thus, the signal strength and the service quality may both be taken into consideration. Said load information is, for example, loads in memory, processor operation or network throughput of each MEC platform. Due to hardware diversity, the forms of said load information and hand-over parameters are not limited thereto. In other words, a method relative to adjusting hand-over parameters of one or more BSs is covered by this disclosure.

Figure 12:
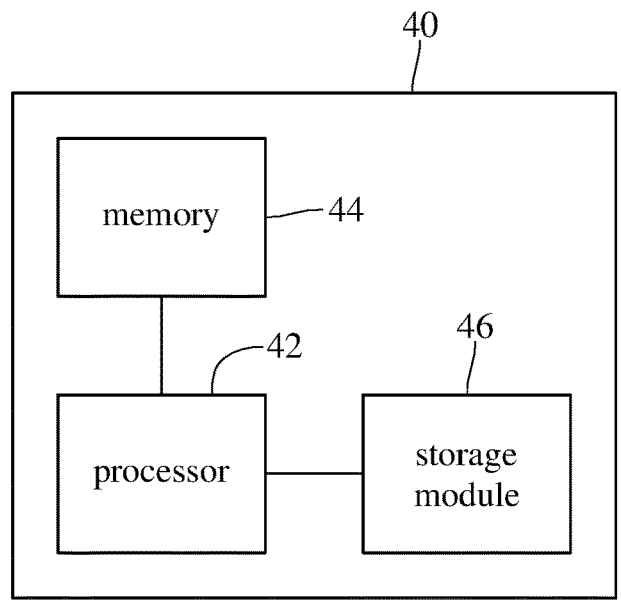
FIG. 12 is a function block diagram of an MEC device in an embodiment of this disclosure.
Figure 13:
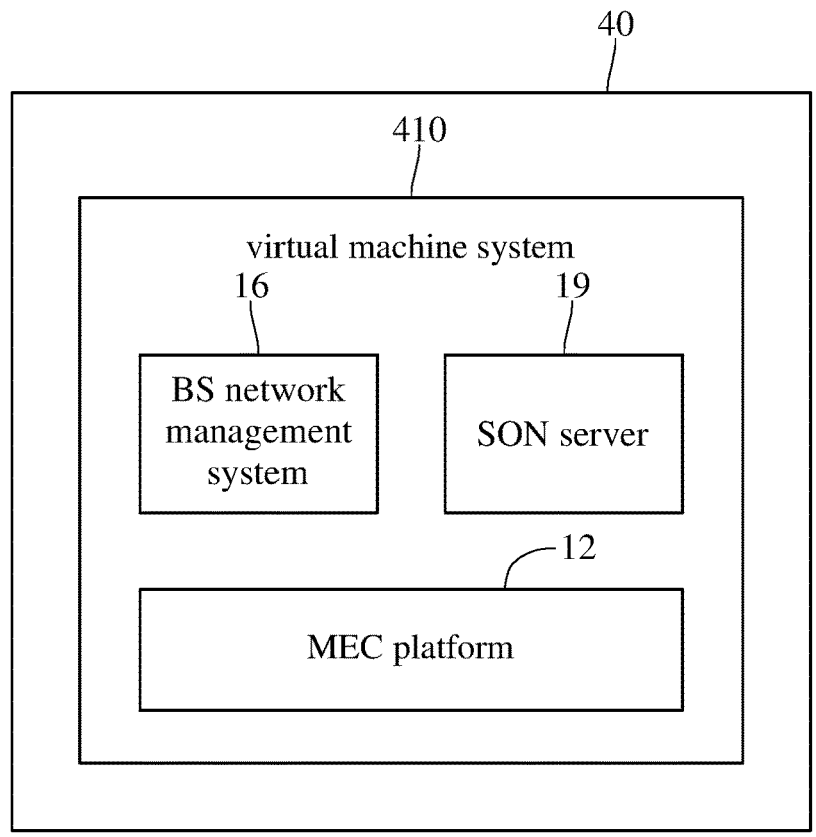
FIG. 13 is a system architecture diagram of an MEC device in an embodiment of this disclosure.

According to the above, this disclosure further provides an MEC device. Please refer to FIG. 12 and FIG. 13 for illustration wherein FIG. 12 is a function block diagram of an MEC device in an embodiment of this disclosure and FIG. 13 is a system architecture diagram of an MEC device in an embodiment of this disclosure. As shown by FIG. 12, the MEC device 40 comprises processor 42 and memory 44. The processor 42 is electrically connected to the memory 44. The memory 44 stores a plurality of instructions. When the processor 42 executes the instructions stored in the memory 44, the MEC device 40 operates an MEC platform. The MEC platform is at least configured to perform the steps in the aforementioned embodiment. By FIG. 12, the MEC device 40 further comprises storage medium 46. The storage medium 46 is configured to store said first data pieces and their access records or other parameters or other information. The storage medium 46 is, for example, a hard disk drive (HDD) or a solid state drive (SSD), but is not limited thereto the examples.

By FIG. 13, the MEC device 40 may operate a virtual machine system 410. In this embodiment, the MEC platform 12 may be operated in the virtual machine system. In another embodiment, the virtual machine system 410 may further operate the BS network management system 16 and the SON server 19. In further another embodiment, the MEC device 40 operates a plurality of virtual machine systems, while the MEC platform 12, BS network management system 16 and the SON server 19 are respectively operated in different ones of said virtual machine systems. Therefore, in view of the units in FIG. 10, said first MEC platform 12c, BS network management server 16c and the SON server 19c may be integrated in one single physical machine, such as the MEC device 40.

In one embodiment, the MEC device 40 is configured to communicate with the BS network management server and the first BS. The MEC platform 12 operated by the MEC device 40. The MEC platform 12 is configured to perform the following steps: obtaining a BS ID of a second BS from the BS network management server, wherein a second communication range of the second BS overlaps part of a first communication range of the first BS; generating platform neighbor information which includes a platform ID of the MEC platform and the BS ID of the second BS; providing the platform neighbor information to a central management server for providing the platform neighbor information to another MEC platform with whom the central management server communicates through the central management server, wherein the platform neighbor information includes the BS ID of the second BS. The MEC platform 12 in this embodiment is, for example, the first MEC platform 12a of the embodiment in FIG. 1 and FIG. 2. The units and their acts can be referred to the aforementioned descriptions but are not limited thereto.

In another embodiment, the MEC device 40 is configured to communicate with the BS network management server and the first BS. The MEC platform 12 operated by the MEC device 40 is further configured to perform the following steps: determining whether the request signal matches the platform neighbor information by the MEC platform when the MEC platform receives a request signal broadcasted by another MEC platform; and providing a platform ID to said another MEC platform by the MEC platform when the MEC platform determines that the request signal matches the platform neighbor information. The MEC platform 12 in this embodiment is, for example, the first MEC platform 12a of the embodiment in FIG. 3. The units and their acts can be referred to the aforementioned descriptions but are not limited thereto.

After the MEC device 40 establishes neighbor relation ship with another MEC device according to the above steps, the MEC platform 12 operated by the MEC device 40 can further perform the following steps.

In one embodiment, the storage medium 46 is configure to store a plurality of first data pieces, with each of the first data pieces corresponding to a first access record. A plurality of second data pieces is stored in a second storage medium of said another MEC platform, with each of the second data pieces corresponding to a second access record. The MEC platform 12 is further configured to perform steps comprising: establishing neighbor relationship with another MEC platform according to a confirmation signal provided by the another MEC platform; communicating with said another MEC platform to determine whether any of the first data pieces is the same as any of the second data pieces when the rest of a first storage space of the storage medium 46 is equal to or larger than a default size; selectively deleting at least one of the first data pieces by the MEC platform according to the first access records and the second access records when one of the first data pieces is determined as the same as one of the second data pieces. The MEC platform 12 in this embodiment is, for example, the first MEC platform of the embodiment in FIG. 6. The units and their acts can be referred to the aforementioned descriptions but are not limited thereto.

Moreover, in one implementation of this embodiment, one of the first access records has a first access number of one of the first data pieces in a default time interval and one of the second access records has a second access number of one of the second data pieces in the default time interval. The MEC platform 12 further performs steps comprising: determining whether there is any repeated data piece in both of the first data pieces and the second data pieces; obtaining a sum of the first access number of a first repeated data piece in the first data pieces and the second access number of a second repeated data piece in the second data pieces, and replacing the first access number of the first repeated data piece with the sum when the first repeated data piece and the second repeated data piece are determined as the same; deleting one of the first data pieces, with said one of the first data pieces having a least first access number of the first data pieces. The MEC platform 12 in this implementation is, for example, the first MEC platform of the embodiment in FIG. 7. The units and their acts can be referred to the aforementioned descriptions but are not limited thereto.

In another implementation of this embodiment, the first access record has a first last-access-time-point of each piece of first data pieces, and the second access record has a second last-access-time-point of each piece of second data pieces. The MEC platform further performs steps comprising: determining whether there is a repeated data piece in both of the first data pieces and the second data pieces by the MEC platform 12; comparing the first last-access-time-point of a first repeated data piece with the second last-accesstime-point of a second repeated data piece when the first repeated data piece in the first data pieces is determined the same as the second repeated data piece in the second data pieces; replacing the value of the first last-access-time-point with the value of the second last-access-time-point when the first last-access-time-point of the first repeated data piece is determined as being earlier than the second last-access-time-point of the second repeated data piece; and deleting the one of the first data pieces, with said one of the first data pieces having an earliest least first last-access-time-point of the first data pieces. The MEC platform 12 in this implementation is, for example, the first MEC platform of the embodiment in FIG. 8. The units and their acts can be referred to the aforementioned descriptions but are not limited thereto.

In a further embodiment, said first BS is configured to communicate with the terminal device. Said network communication system further comprises a SON server. After providing the first platform ID to another MEC platform, the MEC platform 12 operated by the MEC device 40 is further configure to perform the following steps comprising: establishing neighbor relationship with another MEC platform according to a confirmation signal provided by said another MEC platform; obtaining a second load information of the another MEC platform, wherein the second load information corresponds to loads of at least one second processor of the another MEC platform or corresponding to loads of at least one second memory of the another MEC platform; and providing the second load information to the SON server. The MEC platform 12 in this implementation is, for example, the first MEC platform of the embodiment shown in FIG. 9. The units and their acts can be referred to the aforementioned descriptions but are not limited thereto.

Figure 14:
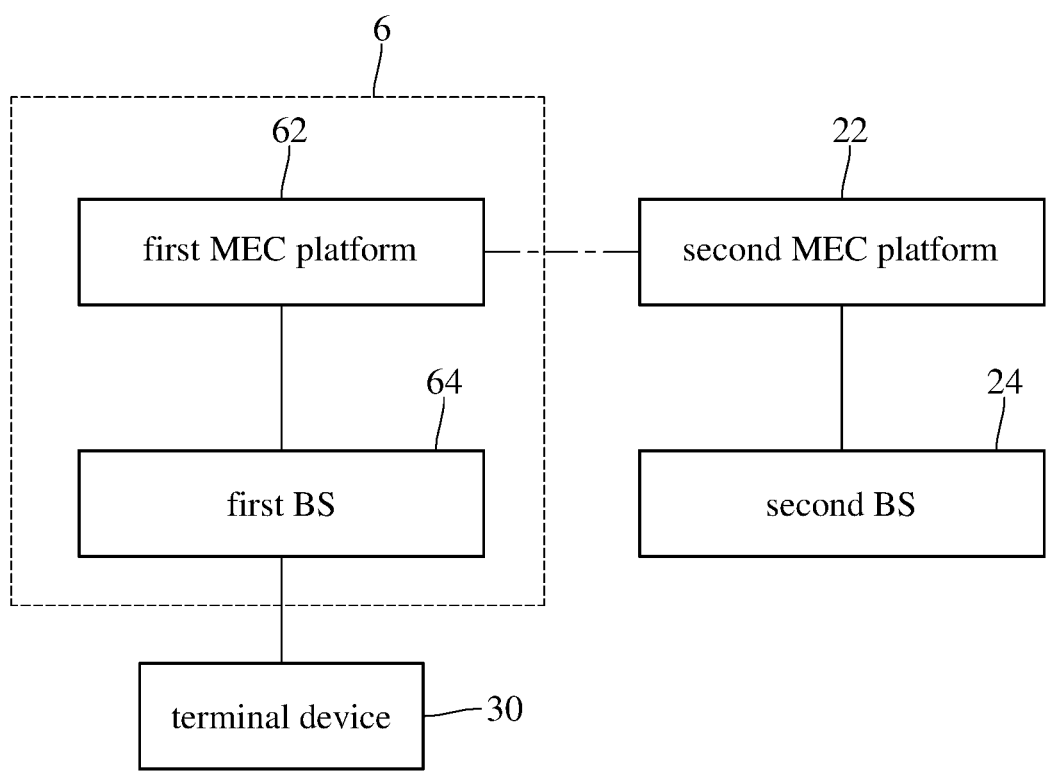
FIG. 14 is a function block diagram of a network communication system in an eighth embodiment of this disclosure.
Figure 15:
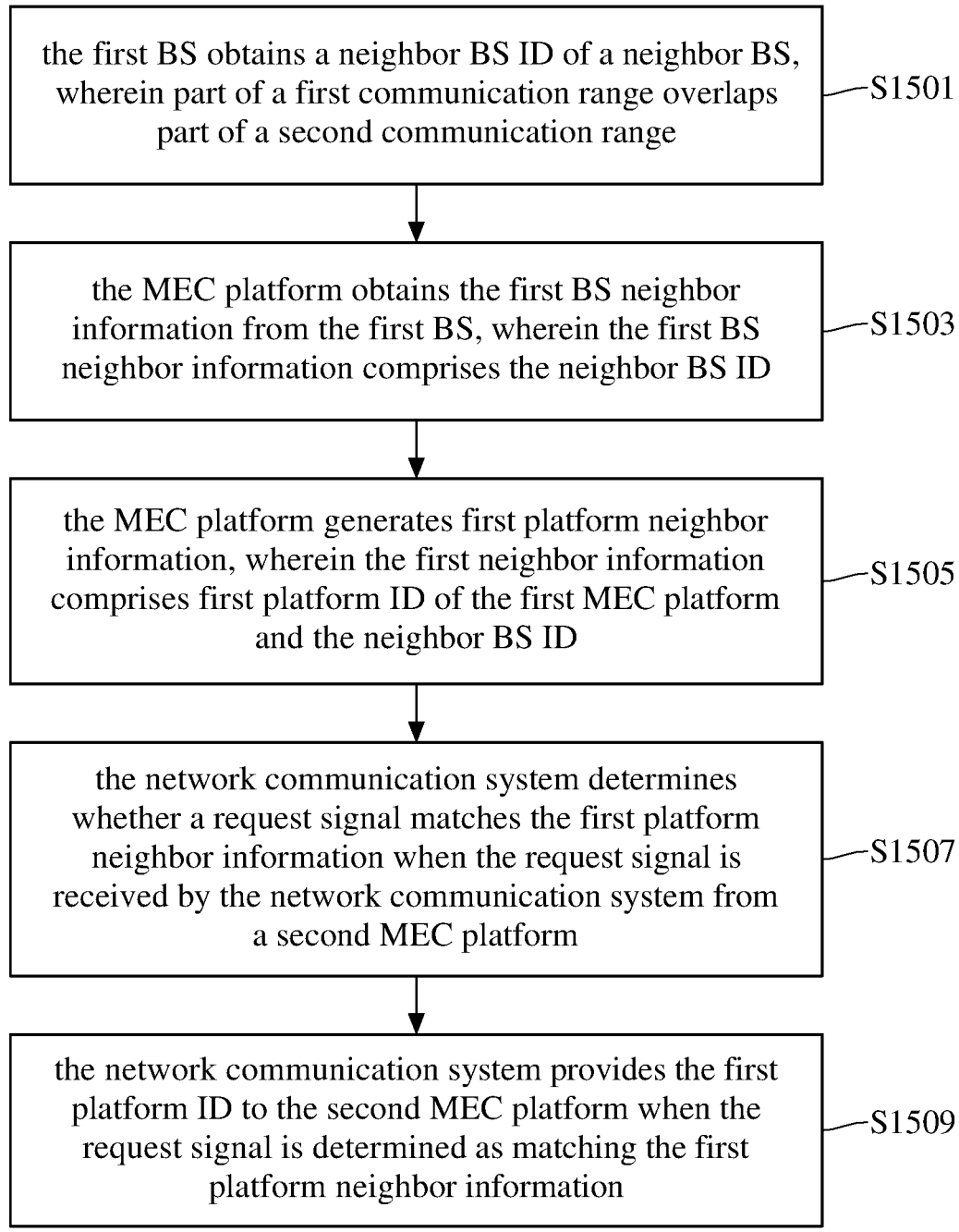
FIG. 15 is a flowchart for a control method for a network communication system including a BS network management server in an eighth embodiment of this disclosure.

Please refer to FIG. 14 and FIG. 15, wherein FIG. 14 is a function block diagram of a network communication system in an eighth embodiment of this disclosure and FIG. 15 is a flowchart for a control method for a network communication system including a BS network management server in an eighth embodiment of this disclosure. In the embodiment shown in FIG. 14, a network communication system 6 comprises a first MEC platform 62 and a first BS 64. The first MEC platform 62 communicates with the first BS 64. The first BS 64 is configured to communicate with the terminal device 30. Corresponding to the architecture of this network communication system, the control method in FIG. 15 comprises the following steps. In step S1501, the first BS 64 obtains a neighbor BS ID of a neighbor BS, wherein part of a first communication range overlaps part of a second communication range. In step S1503, the MEC platform 62 obtains the first BS neighbor information from the first BS 64, wherein the first BS neighbor information comprises the neighbor BS ID. In step S1505, the MEC platform 62 generates first platform neighbor information, wherein the first neighbor information comprises first platform ID of the first MEC platform 62 and the neighbor BS ID. In step S1507, the network communication system determines whether a request signal matches the first platform neighbor information when the request signal is received by the network communication system from a second MEC platform 22. In step S1509, the network communication system provides the first platform ID to the second MEC platform 22 when the request signal is determined as matching the first platform neighbor information.

After finishing this disclosure, a person having ordinary skill in the art can understand that the aforementioned embodiments can be implemented in combination. Furthermore, the embodiment of FIG. 14 and FIG. 15 can be combined with the embodiment of FIG. 3 to FIG. 13 for adjustment. Specifically, in the embodiment of FIG. 14 and FIG. 15, the first MEC platform 62 obtains BS neighbor information directly. Therefore, with the scenario of the embodiment of FIG. 14 and FIG. 15, the BS network management server in FIG. 3 to FIG. 13 can be removed. Similarly, in the embodiment shown in FIG. 14 and FIG. 15 and its extensive examples, after the first MEC platform 62 obtains the BS neighbor information from the corresponding BS, the first MEC platform 62 generates platform neighbor information according to the BS neighbor information. As mentioned above, the neighbored MEC platforms can establish neighbor relation by the central management server, or the neighbored MEC platforms can establish neighbor relation by broadcasting one or more signals. When the neighbored MEC platforms establish neighbor relationship with the corresponding one or more other MEC platforms, the MEC platforms can exchange information with the corresponding one or more ones to manage contents or adjust handover parameters as mentioned above.

Further more, the MEC device provided in this disclosure can be implemented in other ways according to FIG. 14 and FIG. 15.

In one embodiment, the MEC device is configured to communicate with the first BS. The MEC device comprises a processor and a memory. The memory stores a plurality of instructions. When the processor executes the instructions, the MEC device operates an MEC platform. The MEC platform is configured to perform the following steps: obtaining a BS ID of a second BS from the BS network management server, wherein a second communication range of the second BS overlaps part of a first communication range of the first BS; generating platform neighbor information which includes a platform ID of the MEC platform and the BS ID of the second BS; and providing the platform neighbor information to a central management server for providing the platform neighbor information to another MEC platform with whom the central management server communicates through the central management server, wherein the platform neighbor information includes the BS ID of the second BS. The MEC device 40 in this implementation is, for example, the MEC device of the embodiment shown in FIG. 12 and FIG. 13 with different acts. Details about the units can be referred to the aforementioned descriptions but are not limited thereto.

In another embodiment, the MEC device is configured to communicate with the first BS. The MEC device comprises a processor and a memory. The memory stores a plurality of instructions. When the processor executes the instructions, the MEC device operates an MEC platform. The MEC platform is configured to perform the following steps:

determining whether the request signal matches the platform neighbor information by the MEC platform when the MEC platform receives a request signal broadcasted by another MEC platform; and providing a platform ID to the another MEC platform by the MEC platform when the MEC platform determines that the request signal matches the platform neighbor information. The MEC device 40 in this implementation is, for example, the MEC device of the embodiment shown in FIG. 12 and FIG. 13 with different acts. Details about the units can be referred to the aforementioned descriptions but are not limited thereto.

Similarly, after a person having ordinary skill in the art finishes this disclosure, the person having ordinary skill in the art can understand that the MEC device disclosed herein can be combined with the embodiments of FIG. 3 to FIG. 13 but is not limited thereto.

In view of the above description, this disclosure provides a MEC device and a control method for a network communication system including a BS network management server. According to the control method and the MEC device, an operated MEC platform is configured to establish neighbor relationship with another neighbor MEC device and to obtain information related to the neighbor MEC device. Different MEC platforms communicate to different BSs respectively. Information requests or operation request from a mobile device are likely to be handled by different MEC device because it's possible that the mobile is handed over from one BS to another. With the control method and the MEC device provided by this disclosure, the MEC device can refer to not only its own information and information about BS but also information about another MEC device when a MEC device deals with mobile communication operations. As a result, MEC devices can make decisions with broader vision, considering with information related to other MEC devices.

It will be apparent to those skilled in the art that various modifications and variations can be made to the disclosed embodiment. It is intended that the specification and examples be considered as exemplary only, with a true scope of the disclosure being indicated by the following claims and their equivalents.

What is claimed is:

1. A control method for a network communication system including a BS network management server, which is adapted to a network communication system, wherein the network communication system comprises a first MEC platform, a first BS and the BS network management server, and the BS network management server communicates with the first MEC platform and the first BS, comprises:
    obtaining a neighbor BS ID of a neighbor BS by the first BS, wherein a first communication range of the first BS overlaps part of a second communication range of the neighbor BS;
    providing first BS neighbor information to the BS network management server by the first BS, wherein the first BS neighbor information includes the neighbor BS ID;
    obtaining the first BS neighbor information from the BS network management server by the first MEC platform;
    generating first platform neighbor information by the first MEC platform, wherein the first platform neighbor information includes a first platform ID of the first MEC platform and the neighbor BS ID;
    by confirming whether a request signal has the neighbor BS ID, determining whether the request signal matches the first platform neighbor information by the network communication system when the request signal is received by the network communication system from a second MEC platform; and
    when the request signal has the neighbor BS ID, determining the request signal matches the first platform neighbor information and further providing the first platform ID to the second MEC platform.

2. The method according to claim 1, wherein the network communication system comprises a central management server, and the first MEC platform communicates with the central management server, further comprising:
    providing the first platform neighbor information to the central management server by the first MEC platform;
    determining whether the request signal matches the neighbor BS ID when the request signal from the second MEC platform is received by the central management server; and
    providing the first platform ID to the second MEC platform by the central management server when the request signal and the first platform neighbor information are determined as matching each other.

3. The method according to claim 1, further comprising:
    determining whether the request signal matches the first platform neighbor information by the first MEC platform when the request signal broadcasted by the second MEC platform is received by the first MEC platform; and
    providing the first platform ID to the second MEC platform by the first MEC platform when the request signal and the first platform neighbor information are determined as matching each other.

4. The method according to claim 1, wherein a plurality of first data pieces is stored in a first storage medium of the first MEC platform, with each first data piece corresponding to a first access records, and a plurality of second data pieces is stored in a second storage medium of the first MEC platform, with each second data piece corresponding to a second access records, wherein, after the step of providing the first platform ID to the second MEC platform, the method further comprises:
    establishing communication between the first MEC platform and the second MEC platform to determine whether any one of the first data pieces is the same as any one of the second data pieces when the rest of a first storage space of the first MEC platform is equal to or smaller than a default size; and
    selectively deleting at least one of the first data pieces by the first MEC platform according to the first access record and the second access record when one of the first data pieces is determined as the same as one of the second data pieces.

5. The method according to claim 4, wherein the first access record has a first access number of each of the first data pieces in a default time interval, and the second access record has a second access number of each of second data pieces in the default time interval, wherein, when selectively deleting the at least one the first data pieces according to the first access record and the second access record, the method further comprises:
    determining whether there is any repeated data piece in both of the first data pieces and the second data pieces by the first MEC platform;
    obtaining a sum of the first access number of a first repeated data piece and the second access number of a second repeated data piece by the first MEC platform and replacing the value of the first access number of the first repeated data piece with the sum by the first MEC platform, when the first repeated data piece in the first data pieces is determined as being the same as the second repeated data piece in the second data pieces; and
    deleting one of the first data pieces by the first MEC platform, with said one of the first data pieces having a least first access number of the first data pieces.

6. The method according to claim 4, wherein the first access record has a first last-access-time-point of each piece of first data pieces and the second access record has a second last-access-time-point of each piece of second data pieces, wherein, when selectively deleting the at least one the first data pieces according to the first access record and the second access record, the method further comprises:
    determining whether there is a repeated data piece in both of the first data pieces and the second data pieces by the first MEC platform;

comparing the first last-access-time-point of a first repeated data piece with the second last-access-time-point of a second repeated data piece by the first MEC platform when the first repeated data piece in the first data pieces is determined as being the same as the second repeated data piece in the second data pieces;

replacing the value of the first last-access-time-point with the value of the second last-access-time-point by the first MEC platform when the first last-access-time-point of the first repeated data piece is determined as being earlier than the second last-access-time-point of the second repeated data piece by the first MEC platform; and deleting the one of the first data pieces by the first MEC platform, with said one of the first data pieces having an earliest least first last-access-time-point of the first data pieces.

7. The method according to claim 1, with the first BS configured to communicate with a terminal device, and with the network communication system comprising a SON server configured to communicate with the first MEC platform, wherein, after the step of providing the first platform ID to the second MEC platform, the method comprises:

obtaining a second load information from the second MEC platform by the first MEC platform, wherein the second load information corresponds to loads of at least one second processor of the second MEC platform or corresponding to loads of at least one second memory of the second MEC platform;

providing the second load information to the SON server by the first MEC platform; and adjusting at least one hand-over parameter of the first BS according to a first load information of the first MEC platform and the second information by the SON server.

8. A MEC device configured to communicate with a BS network management server and a first BS, wherein the MEC device comprises a processor and a memory, the processor is electrically connected to the memory storing a plurality of instructions, the processor is adapted to execute the instructions for the MEC device to operate an MEC platform, and the MEC platform is configured to perform steps comprising:

obtaining a BS ID of a second BS from the BS network management server, wherein a second communication range of the second BS overlaps part of a first communication range of the first BS;

generating platform neighbor information which includes a platform ID of the MEC platform and the BS ID of the second BS; and providing the platform neighbor information to a central management server and determining whether a request signal matches the platform neighbor information by confirming whether the request signal has the BS ID of the second BS through the central management server; and when the request signal has the BS ID of the second BS, determining that the request signal matches the platform neighbor information and further providing the platform neighbor information to an another MEC platform with whom the central management server communicates through the central management server.

9. The MEC device according to claim 8 wherein the MEC device comprises a first storage medium configured to store a plurality of first data pieces, with each of the first data pieces corresponding to a first access record, and a plurality of second data pieces is stored in a second storage medium of the another MEC platform, with each of the second data pieces corresponding to a second access record, wherein the MEC platform is further configured to perform steps comprising:

establishing neighbor relationship with another MEC platform according to a confirmation signal provided by the another MEC platform;

communicating with the another MEC platform to determine whether any of the first data pieces is the same as any of the second data pieces when the rest of a first storage space of the first storage medium is equal to or larger than a default size;

selectively deleting at least one of the first data pieces by the MEC platform according to the first access records and the second access records when one of the first data pieces is determined as the same as one of the second data pieces; and communicating the MEC platform to the another MEC platform according to a confirmation signal provided by the another MEC platform.

10. The MEC device according to claim 9, wherein one of the first access records has a first access number of one of the first data pieces in a default time interval and one of the second access records has a second access number of one of the second data pieces in the default time interval, wherein, when selectively deleting the at least one of the first data pieces according to the first access records and the second access records, the 20 MEC platform further performs steps comprising:

determining whether there is any repeated data piece in both of the first data pieces and the second data pieces;

obtaining a sum of the first access number of a first repeated data piece in the first data pieces and the second access number of a second repeated data piece in the second data pieces and replacing the first access number of the first repeated data piece with the sum when the first repeated data piece and the second repeated data piece are determined as the same;

deleting one of the first data pieces, with said one of the first data pieces having a least first access number of the first data pieces.

11. The MEC device according to claim 9, wherein the first access record has a first last-access-time-point of each piece of first data pieces, the second access record has a second last-access-time-point of each piece of second data pieces, and the MEC platform further performs steps comprising:

determining whether there is a repeated data piece in both of the first data pieces and the second data pieces by the MEC platform;

comparing the first last-access-time-point of a first repeated data piece with the second last-access-time-point of a second repeated data piece when the first repeated data piece in the first data pieces is determined as being the same as the second repeated data piece in the second data pieces;

replacing the value of the first last-access-time-point with the value of the second last-access-time-point when the first last-access-time-point of the first repeated data piece is determined as being earlier than the second last-access-time-point of the second repeated data piece; and deleting the one of the first data pieces, with said one of the first data pieces having an earliest least first last-access-time-point of the first data pieces.

12. The MEC device according to claim 8, wherein the first BS is configured to communicate with a terminal device, the MEC platform further performs steps comprising:
- establishing neighbor relationship with another MEC platform according to a confirmation signal provided by another MEC platform;
- obtaining a second load information of the another MEC platform, wherein the second load information corresponds to loads of at least one second processor of the another MEC platform or corresponding to loads of at least one second memory of the another MEC platform; and
- providing the second load information to a SON server.

13. A MEC device configured to communicate with a BS network management server and a first BS, wherein the MEC device comprises a processor and a memory, the processor is electrically connected to the memory storing a plurality of instructions, the processor is adapted to execute the instructions for the MEC device to operate an MEC platform, and the MEC platform is configured to perform steps comprising:
- by confirming whether a request signal has the neighbor BS ID, determining whether the request signal matches platform neighbor information by the MEC platform when the MEC platform receives the request signal broadcasted by another MEC platform; and
- when the MEC platform confirms that the request signal has the neighbor BS ID, determining the request signal matches the platform neighbor information and further providing a platform ID to the another MEC platform by the MEC platform.

14. The MEC device according to claim 13, wherein the MEC device further comprises a first storage medium configured to store a plurality of first data pieces, each of the first data pieces corresponding to a first access record, a plurality of second data pieces being stored in a second storage medium of the another MEC platform, each of the second data pieces corresponding to a second access record, and the MEC platform further comprises the following steps:
- establishing neighbor relationship with another MEC platform according to a confirmation signal provided by another MEC platform;
- communicating with the another MEC platform to determine whether any of the first data pieces is the same as any of the second data pieces when the rest of a first storage space of the first storage medium is equal to or larger than a default size; and
- selectively deleting at least one of the first data pieces by the MEC platform according to the first access records and the second access records when one of the first data pieces is determined as the same as one of the second data pieces.

15. The MEC device according to claim 14, wherein one of the first access records has a first access number of one of the first data pieces in a default time interval and one of the second access records has a second access number of one of the second data pieces in the default time interval, wherein, when selectively deleting the at least one of the first data pieces according to the first access records and the second access records, the MEC platform further performs steps comprising:
- determining whether there is any repeated data piece in both of the first data pieces and the second data pieces;
- obtaining a sum of the first access number of a first repeated data piece in the first data pieces and the second access number of a second repeated data piece in the second data pieces and replacing the first access number of the first repeated data piece with the sum when the first repeated data piece and the second repeated data piece are determined as the same; and
- deleting one of the first data pieces, with said one of the first data pieces having a least first access number of the first data pieces.

16. The MEC device according to claim 14, wherein the first access record has a first last-access-time-point of each piece of first data pieces, the second access record has a second last-access-time-point of each piece of second data pieces, and the MEC platform further performs steps comprising:
- determining whether there is a repeated data piece in both of the first data pieces and the second data pieces by the MEC platform;
- comparing the first last-access-time-point of a first repeated data piece with the second last-access-time-point of a second repeated data piece when the first repeated data piece in the first data pieces is determined as being the same as the second repeated data piece in the second data pieces;
- replacing the value of the first last-access-time-point with the value of the second last-access-time-point when the first last-access-time-point of the first repeated data piece is determined as being earlier than the second last-access-time-point of the second repeated data piece; and
- deleting the one of the first data pieces, with said one of the first data pieces having an earliest least first last-access-time-point of the first data pieces.

17. The MEC device according to claim 13, wherein the first BS is configured to communicate with a terminal device, the MEC platform further performs steps comprising:
- establishing neighbor relationship with another MEC platform according to a confirmation signal provided by another MEC platform;
- obtaining a second load information of the another MEC platform, wherein the second load information corresponds to loads of at least one second processor of the another MEC platform or corresponding to loads of at least one second memory of the another MEC platform; and
- providing the second load information to a SON server.

* * * * *